(12) United States Patent
Konev et al.

(10) Patent No.: US 8,243,067 B2
(45) Date of Patent: Aug. 14, 2012

(54) PMI DATA VISUALIZATION

(75) Inventors: Max Konev, Auckland (NZ); Mark Shafer, Auckland (NZ); Jed Fisher, Auckland (NZ)

(73) Assignee: SAP America, Inc, Newton Square, PA (US)

( * ) Notice: Subject to any disclaimer, the term of this patent is extended or adjusted under 35 U.S.C. 154(b) by 1133 days.

(21) Appl. No.: 12/035,354

(22) Filed: Feb. 21, 2008

(65) Prior Publication Data

US 2009/0213116 A1 Aug. 27, 2009

(51) Int. Cl.
*G06T 17/00* (2006.01)
(52) U.S. Cl. ......... 345/420; 345/419; 345/473; 345/427
(58) Field of Classification Search .................. 345/419, 345/420, 426, 427, 421, 422
See application file for complete search history.

(56) References Cited

U.S. PATENT DOCUMENTS

| | | | |
|---|---|---|---|
| 7,148,905 B2* | 12/2006 | Hong et al. | 345/629 |
| 7,170,509 B2* | 1/2007 | Tanaka et al. | 345/419 |
| 7,577,902 B2* | 8/2009 | Hong et al. | 715/232 |
| 7,646,384 B2* | 1/2010 | Anderson et al. | 345/420 |
| 7,873,237 B2* | 1/2011 | Grimaud et al. | 382/276 |
| 2005/0168460 A1* | 8/2005 | Razdan et al. | 345/419 |
| 2006/0274070 A1* | 12/2006 | Herman et al. | 345/474 |
| 2008/0269942 A1* | 10/2008 | Free | 700/182 |
| 2011/0047140 A1* | 2/2011 | Free | 707/706 |

* cited by examiner

*Primary Examiner* — Kimbinh T Nguyen
(74) *Attorney, Agent, or Firm* — Schwegman, Lundberg & Woessner, P.A.

(57) ABSTRACT

Technology creates a better visual perception of PMI data in a three dimensional representation of an object by adjusting the opacity of elements not normal to the view of the user.

20 Claims, 8 Drawing Sheets

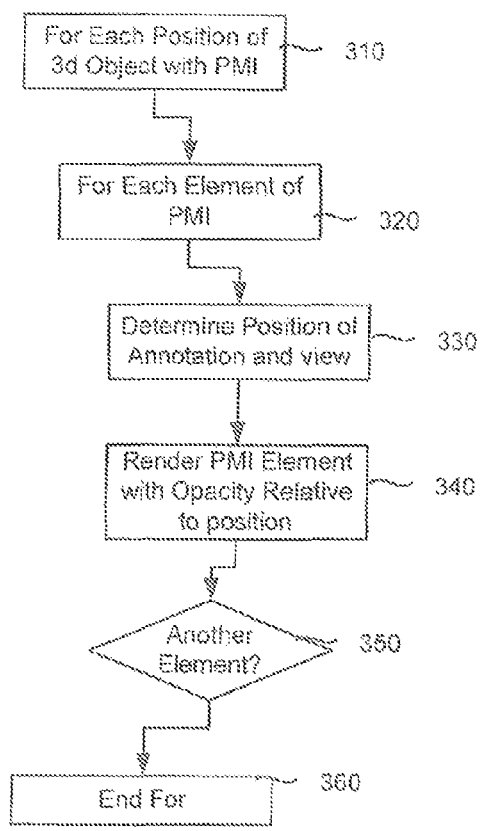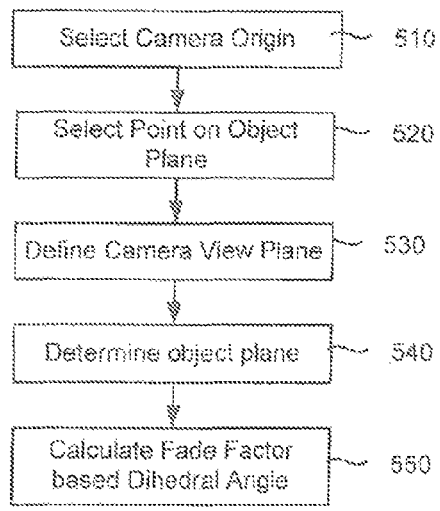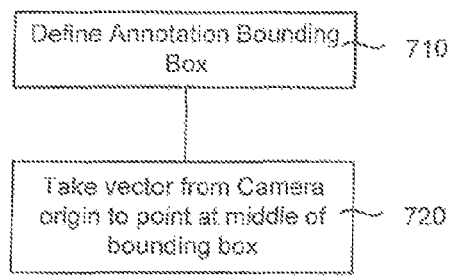

PMI DATA VISUALIZATION

BACKGROUND

Computer aided design (CAD) tools have become standard in many industries. Such tools are used in designing everything from buildings to micro-machines. Generally, designs are created in two dimensional drawings which might include various individual piece drawings as well as assembly and view drawings.

It is often useful when working with design drawings to view three dimensional representations of the objects in the drawings. Three dimensional (3D) visualization of objects is useful in a variety of contexts. For example, CAD designs can be converted to 3D representations to allow designers a better understanding of the element being designed.

Items in CAD drawings include product and manufacturing information or PMI. PMI is used to convey information on the design of a product's components for manufacturing. This includes data such as geometric dimensioning and tolerancing, 3D annotation (text) and dimensions, surface finish, and material specifications.

The PMI annotation is created on the 3D CAD model, and associated to edges and faces. Normally multiple levels of annotations are provided. This layered approach allows the user to switch between various views and have the ability to activate/deactivate each layer or any particular annotation.

SUMMARY

The invention, roughly described, comprises a system and method for presenting PMI information in a visually perceptible manner. Technology creates a better visual perception of PMI data in a three dimensional representation of an object by adjusting the opacity of elements not normal to the view of the user.

In one embodiment, a computer implemented process for creating a visual representation of PMI data in a three dimensional representation includes defining a camera point in a camera view plane; defining an object point in an object plane; calculating an opacity factor based on an angle formed between the planes; and adjusting the opacity of an annotation in the object plane.

The present technology can be accomplished using hardware, software, or a combination of both hardware and software. The software used for the present technology is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present technology will appear more clearly from the following description in which the preferred embodiment of the technology has been set forth in conjunction with the drawings.

BRIEF DESCRIPTION OF THE DRAWINGS

FIG. 3 is a flow chart illustrating a first embodiment of the technology discussed herein.

FIG. 5 is a flow chart illustrating one method for performing a portion of the method shown in FIG. 3.

FIG. 7 is a flow chart illustrating one method for performing a portion of the method shown in FIG. 5.

DETAILED DESCRIPTION

Technology is disclosed for reducing product or manufacturing information in a three dimensional visualization of objects. PMI data which is out of the plane relative to the view of the camera is given a relative importance and the opacity of such data changes relative to that importance.

Figure 1:
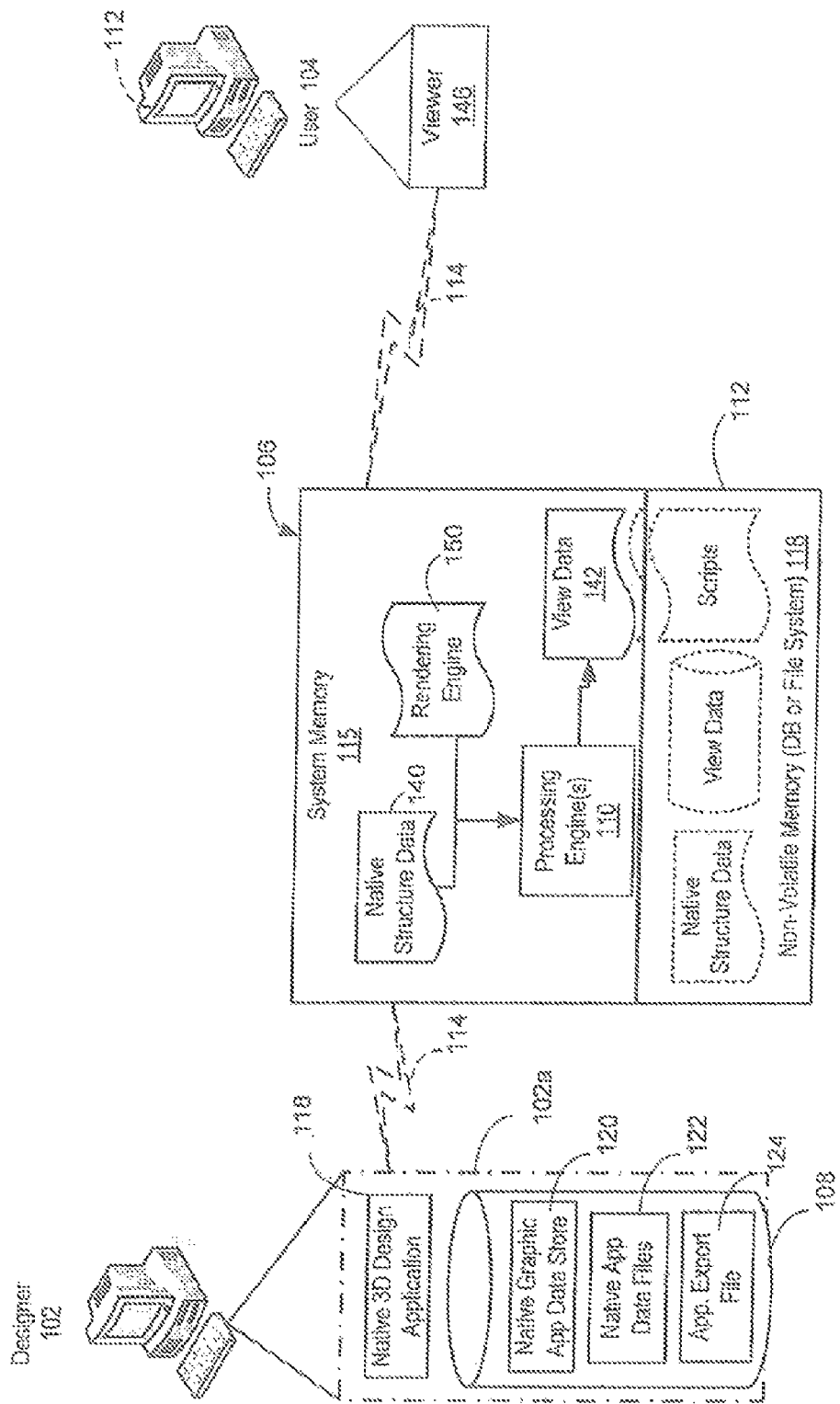
FIG. 1 is a block diagram of one embodiment of a system for implementing the present technology.

FIG. 1 illustrates a system for creating an optimized view of a 3D object visualization and its associated PMI data. FIG. 1 is a block level diagram illustrating certain functional components and data structures utilized in the system suitable for implementing the present technology. In one embodiment, a system 106 includes a processing device 110 employed as a server which stores native graphic application data, employs a rendering engine 150 to create modified object view data 142, and outputs the data to a viewer 146. In one embodiment, the rendering engine may comprise a set of instructions for controlling the processor to convert the native data to view data and/or produce a three dimensional rendering of an object defined by the data on a viewer. The native data may be provided by a designer 102 using another processing device, or the designer may create the native data on the processing device 106. Likewise, the viewer 146 may be provided on another network coupled processing device, or the viewer may operate on device 110. It should be understood that the components of FIG. 1 can be implemented on a single processing system or multiple processing systems.

In one embodiment, designer 102 will create an object design in a native graphic application 118 which stores the design in native application data file or files 122 in data store 120 associated with the application. The native CAD data may be comprised of data from a number of different applications such as AutoCAD, Microstation, SolidWorks, etc., all of which have data in a native format which is accessible in a data store 120 directly by the application. The native data may be alternatively be stored on a file system in data files or may be exported to alternative file formats 124 such as IGES (a commonly used widely read CAD solids format.)

Native application data files or the application data export file 124 may be provided to a processing system 110 to implement the viewing technology discussed herein.

The processing system 106 may include non-volatile memory 112 and system memory 115. As will be generally understood by one of average skill, the components of the system operating in system memory may be stored in non-volatile memory 118 and loaded into system memory at run time as instructed by a system control (not shown). System memory 115 may include a processing engine 110 performing the tasks described in FIGS. 1-10B to take native application data for the object (or application export file data) and provide visualization data in accordance with the methods discussed herein. In one embodiment, the processing engines comprise a series of instructions to instruct a processor (FIG. 2) to provide healed view data 142. The visualization data may be provided by a network 114 to viewer 146 for interpretation by user 104. It should be further understood that the user 104 and graphical designer 102 may be the same individual.

In one embodiment, the processing environment for a system 110 is a client server/network environment such that graphical designer 102 has a unique processing system including a storage unit 108 which houses native graphical data and user 104 has a unique processing system which includes a viewer 146 and communicates with a server 106, itself comprising a unique processing system, via a network communication mechanism 112. It will be readily understood that the network communication mechanism may comprise any combination of public or private networks, local networks and alike such as the Internet. Still further user 104 may have its own unique processing system which includes the viewer. Alternatively, the user 104, designer 102, data and viewer may all reside on and interact with a single processing system, such as processing system 110.

Figure 2:
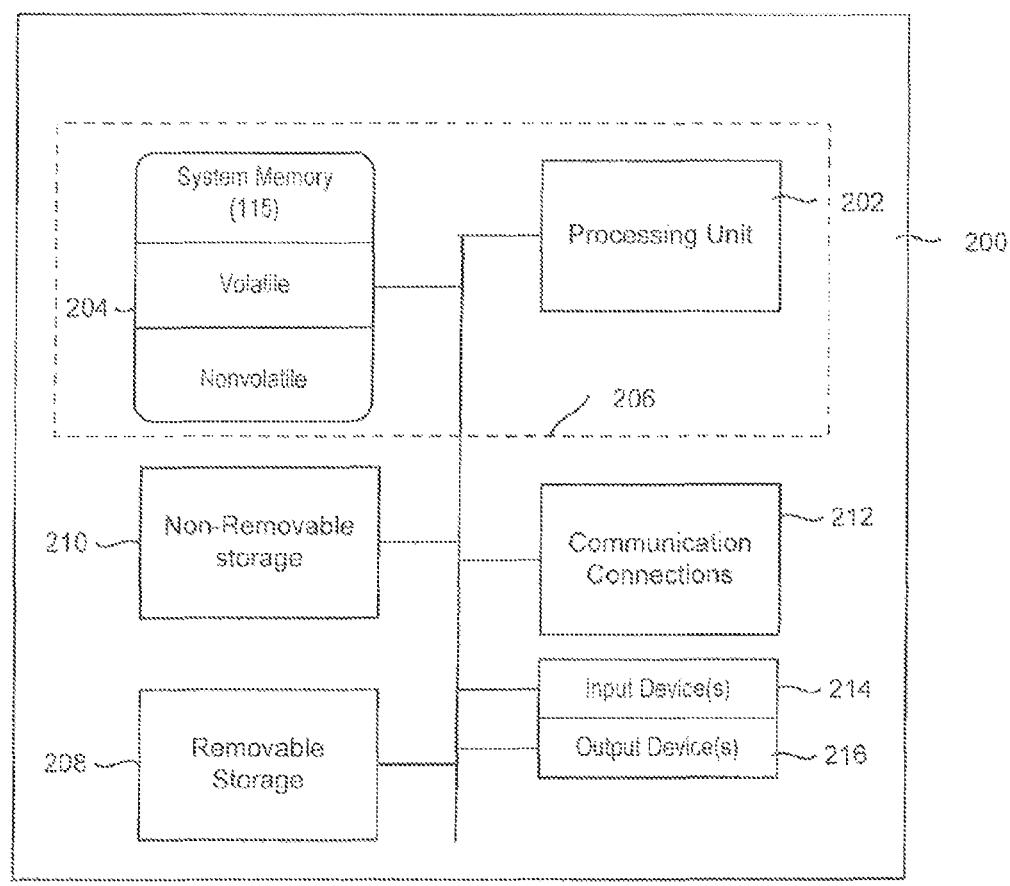
FIG. 2 is a block diagram of a processing system which may be utilized in accordance with the present technology.

With reference to FIG. 2, an exemplary processing system used in the system of FIG. 1 for implementing the technology includes at least one computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This memory is equivalent to system memory 115 in FIG. 1. This most basic configuration is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

Device 200 may also contain communications connection(s) 212 that allow the device to communicate with other devices including communication via a network such as network 114. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Device 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

FIG. 3 illustrates a method which may be performed by the rendering engine 150 to reduce PMI clutter. FIG. 3 illustrates a method which may be embodied in instructions to a processing device to complete a computer based 3D rendering method designed to reduce the onscreen visual clutter of PMI such as measurement information.

At step 310, for each position of a three dimensional object with PMI, and at step 320, for each element of PMI data associated with the object at step 320, the position of the object and the view of the object relative to a camera position is determined at step 330. Once the position of the object and the camera view have been determined at step 330, the PMI data is rendered with an opacity of between 0 and 100%, depending on the relative positions of the view and the annotation plane at step 340. At step 350, the loop repeats for each element of PMI data in the 3D rendering. At step 360, the FOR loop is complete and awaits a repositioning of the object at step 310.

Figure 4A:
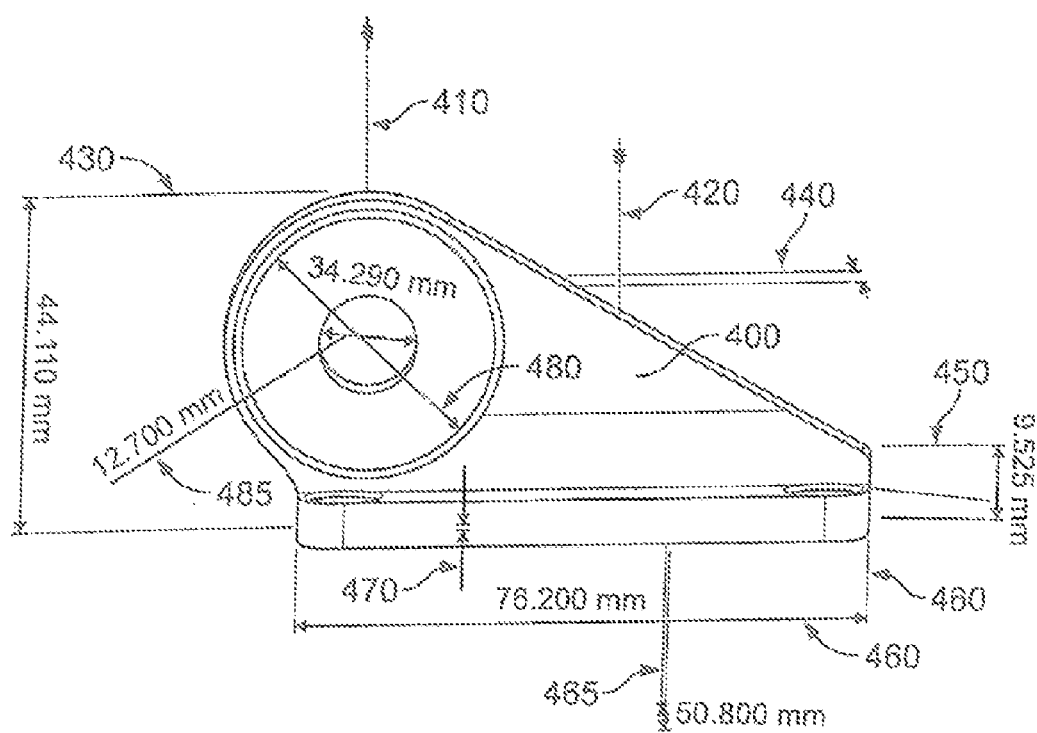
FIGS. 4A and 4B are views of a three dimensional object illustrating fully opaque PMI data and PMI data viewed using the technology discussed herein, respectively.

FIG. 4A illustrates a side view of a three dimensional object 400 having a plurality of PMI dimensions 410, 420, 430, 440, 450, 460, 465, 470, 480, 485, illustrated therein. In FIG. 4A, there is no compensation for relative positions of the PMI elements and the viewer position. Each element of PMI is shown as completely opaque. Information elements 410, 420, 440, 465 which have dimensions which are unreadable given position of the camera view. These elements provide information on dimensions which are not perceptible in the view shown in FIG. 4A because the elements define dimensions that are in a plane generally perpendicular to a plane defined by the page of the drawing. Note that the nature of elements 410, 420, 440, 465 can all be seen in various depictions in FIGS. 8A and 9A.

Figure 4B:
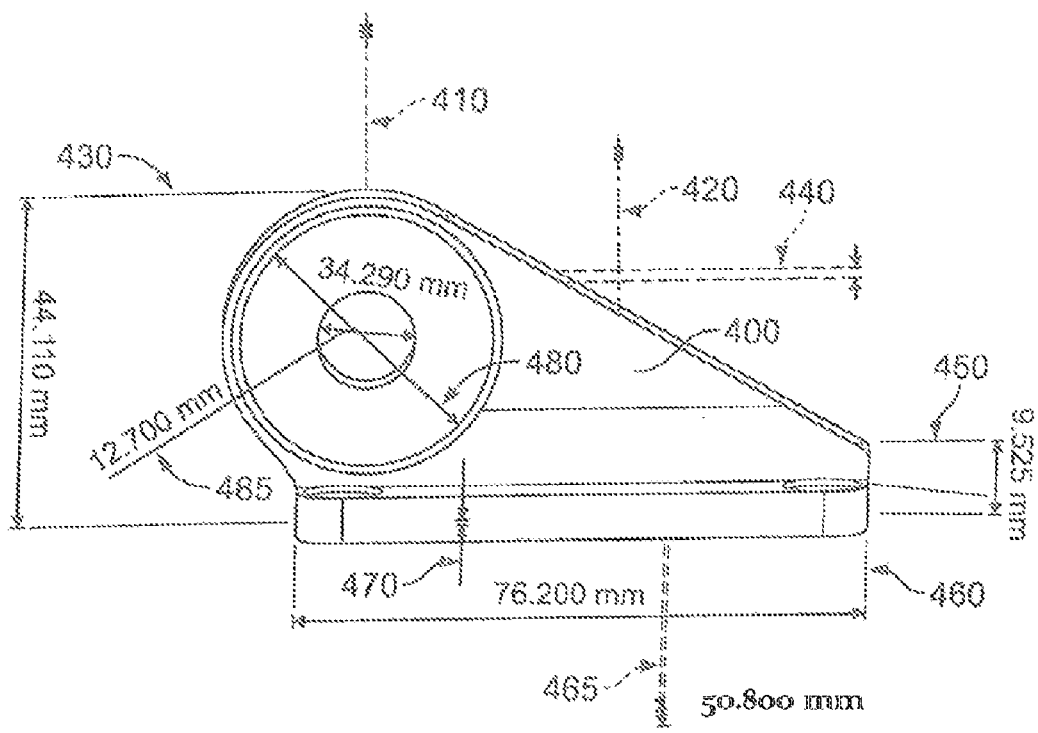

FIG. 4B shows the results of applying the method of FIG. 3 to the view in FIG. 4A. In FIG. 4B, items 410, 420, 440, 465 for example, are rendered with a reduced opacity since their relevance to the view in FIG. 4B has been determined relative to the point of view of the viewer. Notably, both the opacity of the score lines and the dimension numerals is reduced.

In FIG. 4B and all figures herein, dashed lines are used to illustrate lines with an opacity of less than 100%. As such, the following legend applies to the PMI data:

| Opacity | Line Segment |
|---------|--------------|
| 100%    | ——————       |
| 75%     | - - - - - -  |
| 50%     | —·—·—·—·—·—· |
| 25%     | ············ |
| 0%      | Blank        |

It will be understood that the above representations are exemplary only, and the percentages approximated. Numerals associated with score lines are illustrated with reduced opacity which is uniform. That is, for purposes of illustration, the numerals having an opacity of less than 100% are illustrated with faded text. However, it should be understood that in one embodiment, the opacity of the numerals will be the same as the adjacent score lines. It will be understood that where the op In accordance with the technology, as described below, the actual appearance of non-parallel PMIs element will be "faded", thereby having a reduced opacity which is determined to be some percentage of 100% opacity. In an alternative embodiment, other display methods (such as changing solid lines to dashed lines as actually displayed in the figure, or combining dashed lines and reduced opacity in non-parallel elements) can be used.

FIG. 5 illustrates the method performed at step 330 for determining a position of an object, the PMI element and the view with respect to the object and element. FIG. 5 will be explained with respect to FIG. 6A which is a ray diagram illustrating the point of view of the viewer or camera (C) relative to an annotation associated with a three dimensional object 600.

In the method of FIG. 5, at step 510, the camera origin point (C) is selected. Point C is roughly defined as the position of an imaginary observer in a three dimensional scene or the user's point of view. Next, at step 520, an object point (P) is selected. The object point is the position in 3D space that the camera is focused on with respect to. This point P may be selected by any number of methods. In one embodiment, the selection of the point on the object plane at step 530 is accomplished by the method illustrated in FIG. 7. Once the camera origin and object points are defined at steps 510, 520 the camera view plane is defined at step 530. At step 540, the object plane is defined. The determination of the camera and PMI element planes is discussed below.

Figure 6A:
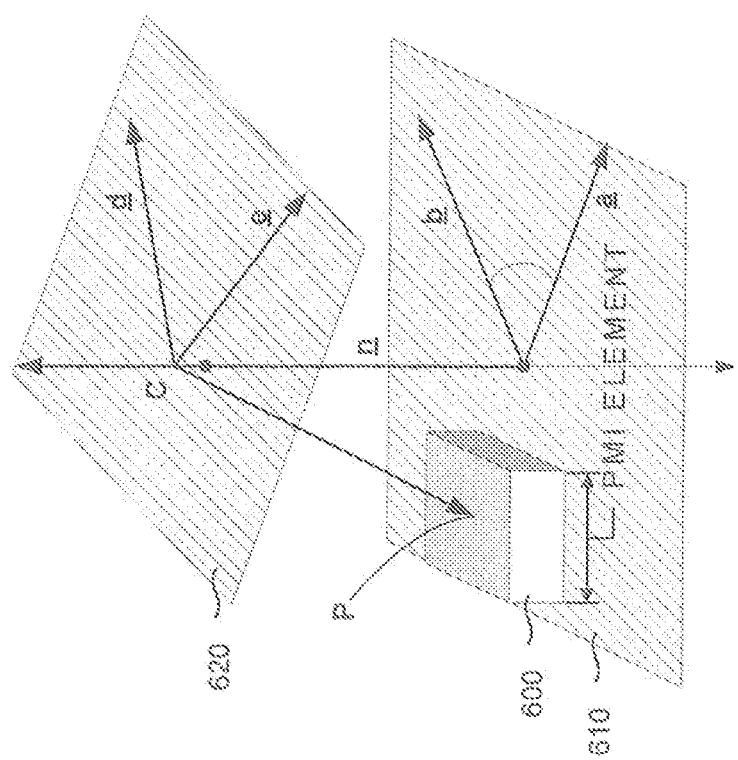
FIGS. 6A and 6B are vector diagrams illustrating the camera position, camera plane, object position and object plane discussed in the written description.
Figure 6B:
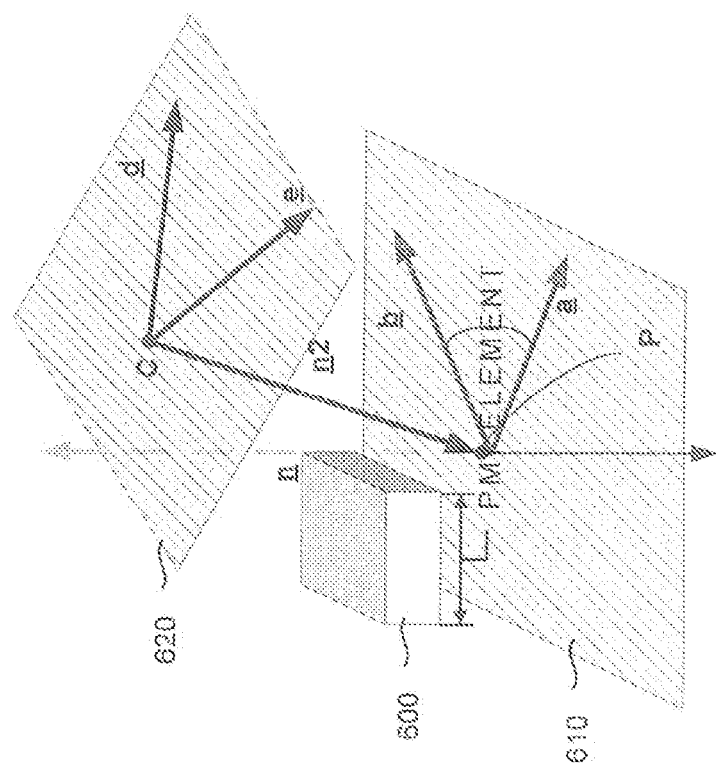

The object plane, plane 610 in FIGS. 6A and 6B, is the plane in which the PMI element (labeled "annotation information" in the Figures) lies. Once the object plane 610 and the camera plane 620 or 620' are known, the fade factor can be calculated at step 550.

The technology is based on the idea that the best visibility of the annotation in the annotation plane 610 should occur when plane 610 is oriented in 3-D space as it would be on a flat ordinary drawing. In other words, the main plane of the annotation 610 is parallel to the plane 620 of the camera view 620, as illustrated in FIG. 6A. When there is a difference in the dihedral angle between the planes, as illustrated in FIG. 6B, some fading of the annotation in plane 610 should occur.

With reference to FIGS. 6A, for any plane, Let P be the point we wish to lie in the plane, and let $\vec{n}$ be a nonzero normal vector to the plane. The desired plane is the set of all points r such that $\vec{n} \cdot (\vec{r} - \vec{p}) = 0$.

If we write $$\vec{n} = \begin{bmatrix} a \\ b \\ c \end{bmatrix},$$

r=(x,y,z) and d as the dot product $\vec{n} \cdot \vec{p} = -d$, then the plane Π is determined by the condition ax+by+cz+d=0, where a, b, c and d are real numbers and a,b, and c are not all zero. The normal of the plane can be calculated from two vectors lying in that plane using the cross-product.

Thus, at step 530, the camera plane is taken as the plane normal to the ray from the camera point C to the object point P and containing point C. The annotation plane is defined by the plane in which the PMI element lies.

In FIG. 6A, annotation plane is defined by vectors a and b. The camera origin point C lies in a second plane 620 defined by d and e. A vector N normal to the annotation plane 610 can be calculated by taking the cross product of vectors a and b. As shown in FIG. 6A, planes 610 and 620 are parallel when the angle between them is equal to 0, plus or minus a tolerance factor. In one embodiment, the tolerance factor is ±0.01 degrees.

To calculate the fade factor at step 550, the dihedral angle between the relative planes—the camera plane and the PMI plane—is determined. Given two planes described by $$a_1 x + b_1 y + c_1 z + d_1 = 0 \text{ and} \qquad \text{II}_1$$

$$a_2 x + b_2 y + c_2 z + d_2 = 0, \qquad \text{II}_2$$

the dihedral angle between them is defined to be the angle α between their normal directions:

$$\cos\alpha = \hat{n}_1 \cdot \hat{n}_2 = \frac{a_1 a_2 + b_1 b_2 + c_1 c_2}{\sqrt{a_1^2 + b_1^2 + c_1^2} \sqrt{a_2^2 + b_2^2 + c_2^2}}.$$

In this instance the dihedral angle is then given by the arcosine of α.

In one embodiment, however, in step 550, the fade factor used is the cosine of the dihedral angle ($\cos(\alpha)$). In this case, the angle will be between 0 (parallel) and 90 degrees (perpendicular), and the cosine between 1 and 0. A fade factor of 1 gives a full opacity, while 0 gives fully transparent. The use of the cosine function allows for a smoothing of the factor (because of the low gradients of the function) near the extremes (0 and 90), and the fact that it yields a higher than linear gradient for other domains. The extremes are the maximum and minimum value of the opacity for the annotation and the cosine acts as a dampening filter for these values, as compared with the true measure of the angle which changes linearly and has a constant gradient.

The fade factor calculated at step 550 is used in step 340 to set the opacity of the PMI element. As a result, the more an annotation is parallel to a camera's plane, the better the information in the annotation can be read. Conversely, less readable annotations will be more perpendicular to the camera and will fade away from the scene, clearing the view, making it easier to see and read the geometry in other annotations.

This is illustrated in FIGS. 8A, 8B, and 9A, 9B. In each of FIGS. 8A and 9A, no correction for the relative rotation of the PMI element is made. As a result, all of annotations shown therein are fully opaque.

Figure 8A:
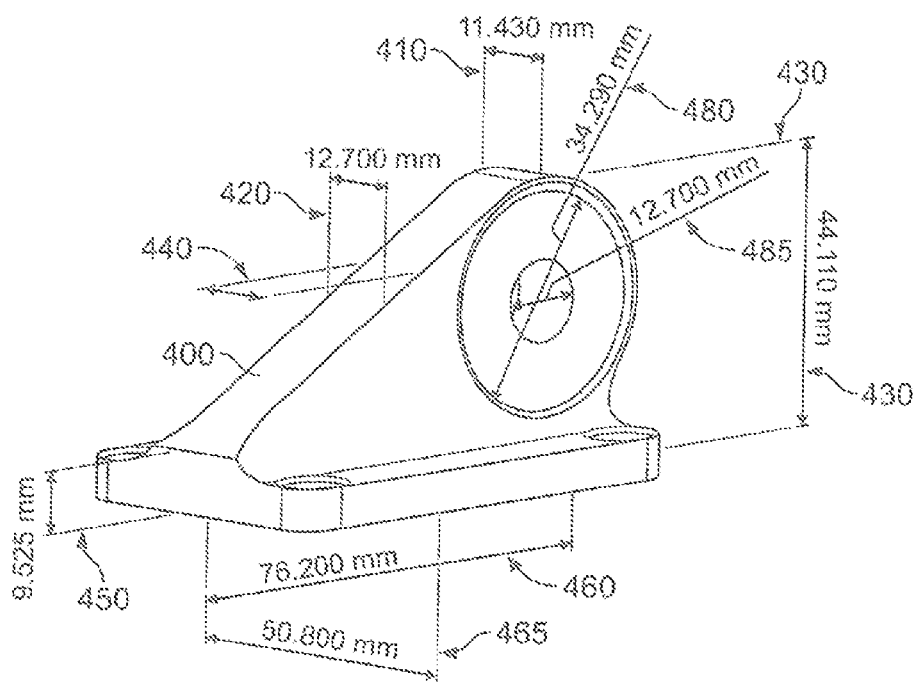
FIGS. 8A and 8B are perspective views of a three dimensional object having fully opaque PMI data and PMI data viewed using the technology discussed herein, respectively.
Figure 8B:
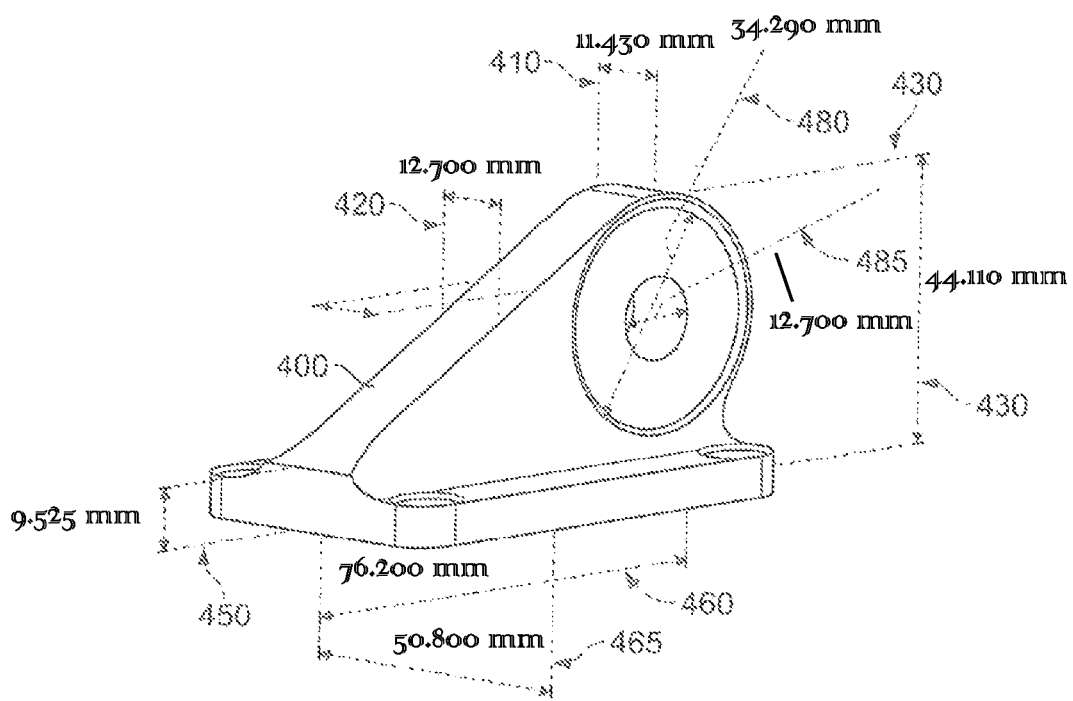

FIGS. 8A and 8B illustrate the effect of only a slight rotational change in the object and hence the angle between the camera plane and each of the annotation planes. FIG. 8B illustrates the technology applied to the view of FIG. 8A. As shown in FIG. 8B, none of the annotations lie in a plane which is parallel to the plane of the camera view. Hence, all of the annotations take on a slightly reduced opacity with respect to the view in FIG. 8A.

Figure 9A:
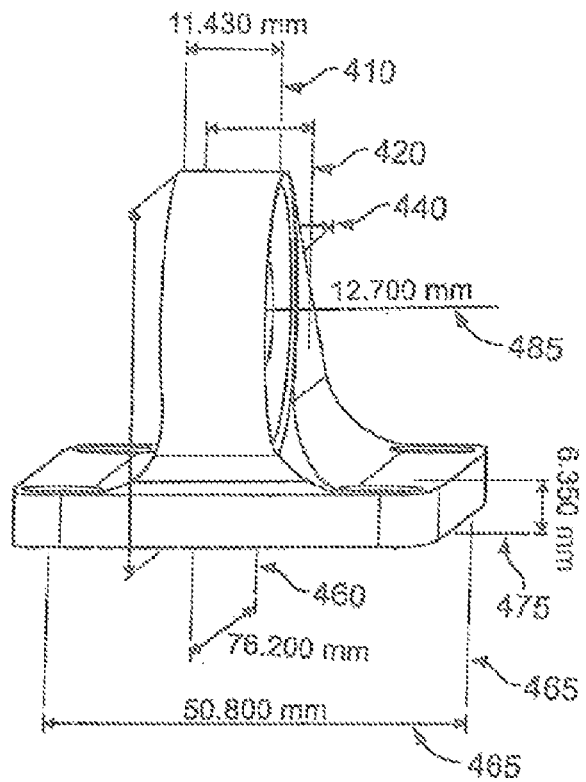
FIGS. 9A and 9B are end views of a three dimensional object having fully opaque PMI data and PMI data viewed using the technology discussed herein, respectively.
Figure 9B:
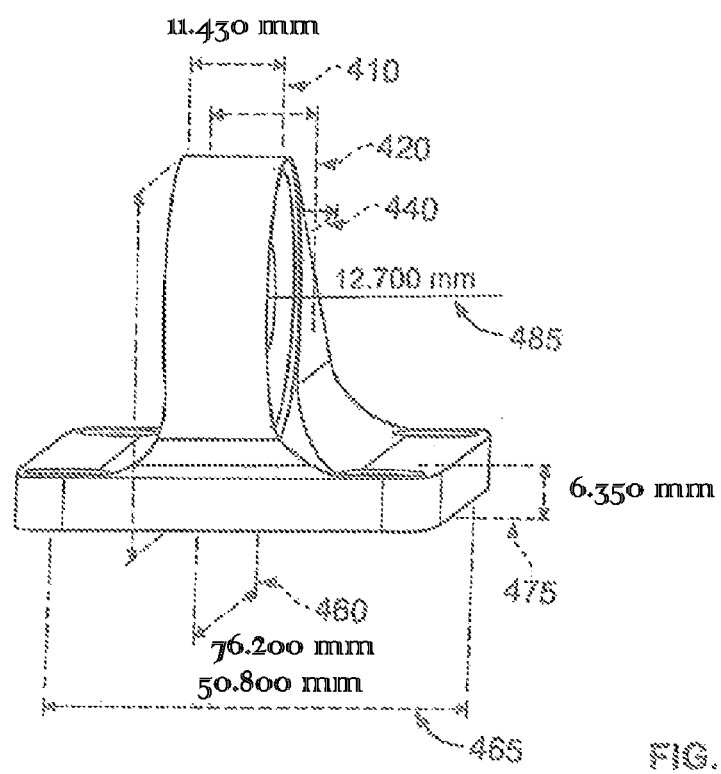

FIGS. 9A and 9B illustrate a second view of the three dimensional object 400. FIG. 9A illustrates the annotations at full opacity while FIG. 9B illustrates the annotations with the technology discussed herein applied to the view of FIG. 9A. As shown therein, certain dimensional views will be nearly transparent relative to their view in FIG. 9A.

In one embodiment, the technology compensates for both an angular difference between the camera and view planes and a perspective difference.

Most 3D visualization technology supports two different view projection types: perspective projection and orthographic projection. An orthographic projection is an affine, parallel projection of an object onto a perpendicular plane. It is very common for CAD models since it represents the model without any distortion as common two dimensional perspective projections. Perspective projection is a type of drawing or rendering that graphically approximates on a planar two dimensional surface the images of three dimensional objects which approximate the actual physical perception. Hence, all perspectives on a planer surface have some degree of distortion, similar to distortion created when the surface of the earth is mapped on a plane. No compensation would be required as long as the object remained in the center of the screen. Perspective correction is required when the object moves off of the center of the screen.

The perspective change between the camera view point C and the annotation is illustrated in FIG. 6B, where the camera view point C is shifted with respect to the annotation.

FIG. 7 illustrates the method used to select the object point from which to determine the plane of the annotation. The method used in FIG. 7 accounts for the perspective projection of the object. In order to compensate for perspective projection, the selection of the object point P in step 520 may be performed by using a bounding box around the annotation in the annotation plane. At step 710, an annotation bounding box is defined. The annotation bounding box is defined as the smallest box in three dimensional space aligned with a coordinate system which completely contains a whole annotation. At step 720, the object point is selected as the middle of the bounding box.

Figure 10A:
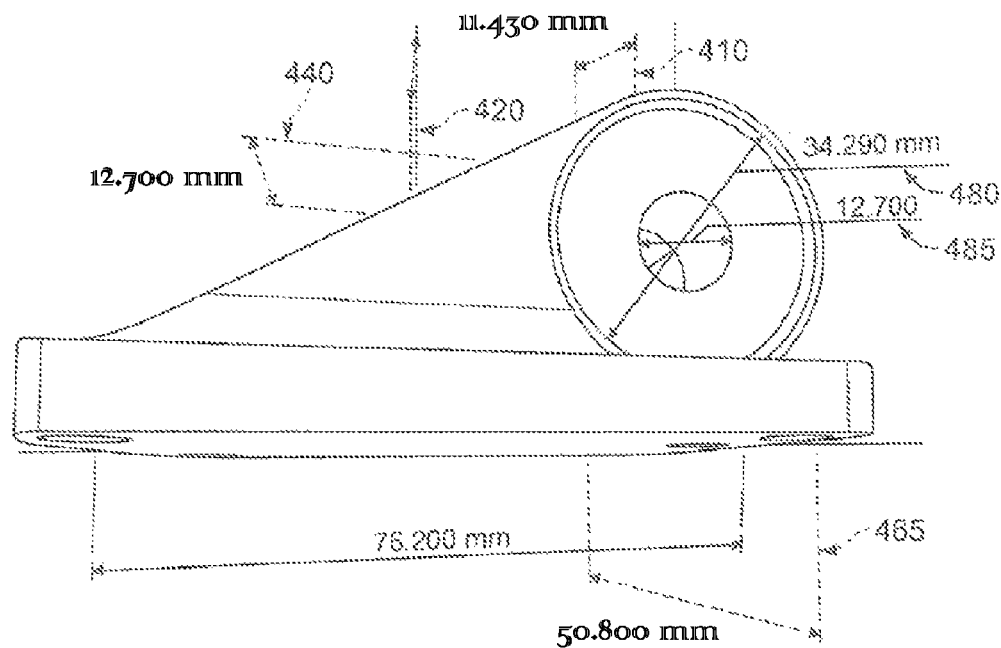
FIGS. 10A and 10B illustrate an alternative perspective view of the three dimensional object viewed using the technology discussed herein without perspective correction and with perspective correction, respectively.
Figure 10B:
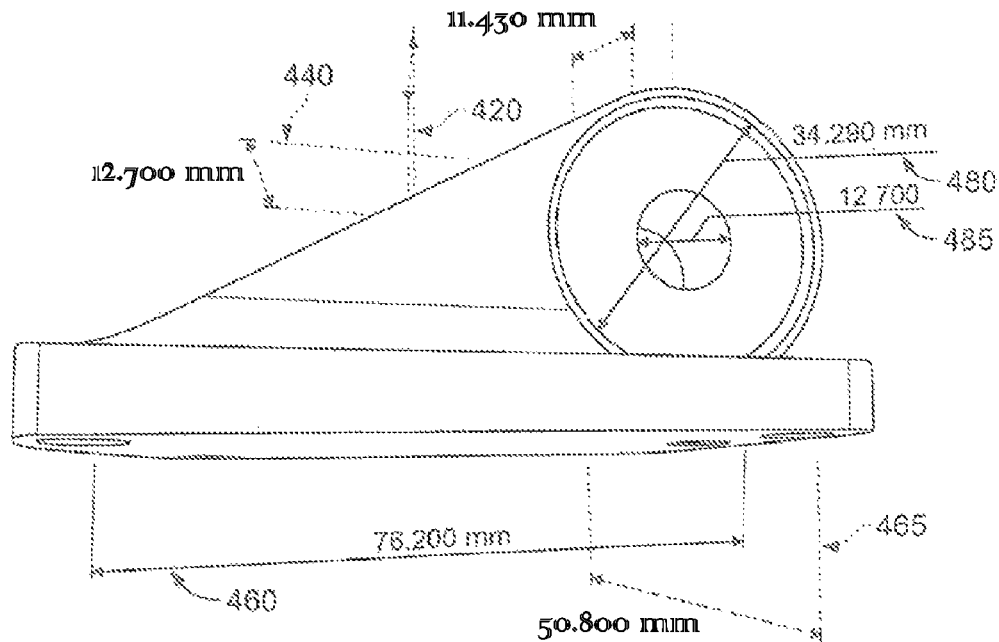

This is compensation for perspective projection is illustrated in FIGS. 6B and 10A-10B. FIG. 6B illustrates a camera origin point C which is offset with respect to the origin point P. In addition, the point P is selected with respect to the PMI element, rather than the object itself Note that in the illustrations of FIGS. 10A and 10B, the use of the perspective movement of the camera relative to the origin point P. In the example shown in FIGS. 4A, 4B, 8A, 8B, 9A and 9B, the three dimensional object 400 is centered in the view depiction. FIGS. 10A and 10B illustrate the perspective change wherein the object 400 is moved out of the center of the 3-D rendering. In other words, a line normal to the center of the page. In the example shown in FIGS. 10A and 10B, a centered line normal to the page is not centered with respect to any of the annotations illustrated in the Figures.

In FIG. 10A, the method is applied without perspective correction. In this case, certain elements appear more transparent than they would were the camera angle not shifted down with respect to the center point of the view in the figure. FIG. 10B illustrates the correction for perspective, noting that certain annotations actually appear more opaque than they do in FIG. 10A.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented process for creating a visual representation of PMI data in a three dimensional representation, comprising:

within a rendering engine that executes on at least one processor of a computing device:

defining a camera point in a camera view plane;
defining an object point in an object plane;
calculating an opacity factor based on an angle formed between the planes; and
adjusting the opacity of an annotation in the object plane.

2. The process of claim 1 wherein the object point defines a point in a plane containing an element of PMI data.

3. The process of claim 1 further including step of determining the camera plane as including the camera point normals to a ray defined from the camera view point and the object point.

4. The process of claim 1 wherein the object point is a position in 3d space on which the camera is focused.

5. The process of claim 1 wherein the object point is selected as the middle of a three dimensional bounding box encompassing a PMI element.

6. The process of claim 1 wherein step of calculating includes calculating the dihedral angle between the planes.

7. The process of claim 1 wherein the step of calculating the opacity factor includes calculating the cosine of the dihedral angle.

8. The process of claim 1 wherein the opacity is full when the dihedral angle is 0 degree.

9. The process of claim 1 wherein the opacity is fully transparent when the dihedral angle is 90 degrees.

10. A computer implemented method of presenting visual information for a three dimensional object including one or more elements of product information, comprising:

within a rendering engine that executes on at least one processor of a computing device:

determining a view position with respect to the three dimensional object;
determining a relationship of an instance of the manufacturing information relative to the view position; and
rendering the opacity of the instance of the manufacturing data based on a plane containing the manufacturing data.

11. The method of claim 10 wherein the step of determining a view position comprises:

determining a camera point and a camera plane.

12. The method of claim 11 wherein the camera plane is determined relative to a ray from the camera point to a point selected in the plane containing the instance of manufacturing data.

13. The process of claim 12 wherein the object point is selected as the middle of a three dimensional bounding box encompassing the PMI element.

14. The process of claim 11 wherein the step of determining a relationship includes calculating the dihedral angle between the camera plane and the plane containing the manufacturing data.

15. The process of claim 14 wherein the step rendering the opacity includes rendering the opacity relative to the value of the cosine of the dihedral angle.

16. The process of claim 15 wherein the opacity is full when the dihedral angle is 0 degree.

17. The process of claim 15 wherein the opacity is fully transparent when the dihedral angle is 90 degrees.

18. A method of presenting a three dimensional representation of an object including a plurality of PMI elements associated with the representation, comprising:

within a rendering engine that executes on at least one processor of a computing device:

(a) determining a camera position;
(b) determining a point on a plane containing an element of PMI;
(c) determining a ray from the camera position to the point;
(d) calculating a plane containing the camera position normal to said ray;
(e) determining the plane containing said element of PMI;
(f) calculating a dihedral angle between the camera plane and the object plane; and
(g) adjusting an opacity of the PMI element in the plane relative to the dihedral angle.

19. The method of claim 18 further including the step of repeating each of steps (b) through (f) for all PMI elements associated with the three dimensional object.

20. The method of claim 18 wherein step (g) is performed by adjusting the opacity relative to the cosine of the dihedral angle.

* * * * *